United States Patent
Ko

(10) Patent No.: US 7,974,829 B2
(45) Date of Patent: Jul. 5, 2011

(54) SYSTEM FOR SIMULATING MOBILE PHONE AND METHOD THEREOF

(75) Inventor: Yung-Chin Ko, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 871 days.

(21) Appl. No.: 11/780,487

(22) Filed: Jul. 20, 2007

(65) Prior Publication Data

US 2008/0020750 A1    Jan. 24, 2008

(51) Int. Cl.
- *G06F 9/455* (2006.01)
- *G06F 9/45* (2006.01)
- *G06F 3/14* (2006.01)
- *G09G 5/00* (2006.01)

(52) U.S. Cl. ............ 703/24; 703/22; 715/864; 345/156; 455/418

(58) Field of Classification Search .................... 703/20, 703/24, 22; 345/156; 715/864; 455/418
See application file for complete search history.

(56) References Cited

U.S. PATENT DOCUMENTS

| | | | | |
|---|---|---|---|---|
| 5,640,448 | A * | 6/1997 | Toyoshima | 379/165 |
| 5,815,707 | A * | 9/1998 | Krause et al. | 719/321 |
| 7,155,381 | B2 * | 12/2006 | Ryzl | 703/24 |
| 7,181,382 | B2 * | 2/2007 | Shier et al. | 703/13 |
| 7,190,351 | B1 * | 3/2007 | Goren | 345/173 |
| 7,190,978 | B2 * | 3/2007 | Saikyo et al. | 455/566 |
| 7,433,935 | B1 * | 10/2008 | Obert | 709/219 |
| 7,689,908 | B2 * | 3/2010 | Yan et al. | 715/238 |
| 2002/0087300 | A1 * | 7/2002 | Patwari | 703/22 |
| 2002/0130834 | A1 * | 9/2002 | Madarasz et al. | 345/156 |
| 2003/0115038 | A1 * | 6/2003 | Want et al. | 703/24 |
| 2003/0156131 | A1 * | 8/2003 | Khazaka | 345/733 |
| 2004/0027326 | A1 * | 2/2004 | Hays et al. | 345/106 |
| 2004/0059557 | A1 * | 3/2004 | Liao et al. | 703/13 |
| 2005/0080610 | A1 * | 4/2005 | Toma et al. | 703/22 |
| 2005/0125211 | A1 * | 6/2005 | Nahata et al. | 703/13 |
| 2006/0129972 | A1 * | 6/2006 | Tyburski et al. | 717/106 |
| 2007/0042763 | A1 * | 2/2007 | Yeh | 455/418 |
| 2007/0127426 | A1 * | 6/2007 | Watters et al. | 370/338 |
| 2007/0157117 | A1 * | 7/2007 | Viitala | 715/810 |
| 2007/0220437 | A1 * | 9/2007 | Boillot | 715/762 |
| 2008/0140380 | A1 * | 6/2008 | Marsyla et al. | 703/26 |
| 2008/0171514 | A1 * | 7/2008 | Gaborit et al. | 455/41.3 |
| 2008/0219240 | A1 * | 9/2008 | Dylag et al. | 370/352 |
| 2008/0307096 | A1 * | 12/2008 | Wang et al. | 709/227 |
| 2009/0138421 | A1 * | 5/2009 | Ansari et al. | 706/25 |
| 2009/0182546 | A1 * | 7/2009 | Gentric | 703/27 |
| 2010/0100591 | A1 * | 4/2010 | Mahaffey et al. | 709/204 |

FOREIGN PATENT DOCUMENTS

| | | |
|---|---|---|
| JP | 2003186875 | 7/2003 |
| JP | 2004038809 | 2/2004 |

* cited by examiner

*Primary Examiner* — Kamini S Shah
*Assistant Examiner* — Akash Saxena
(74) *Attorney, Agent, or Firm* — Jianq Chyun IP Office

(57) ABSTRACT

A system for simulating mobile phone and method thereof is provided. The system has separately designed man-machine-interface (MMI) kernel module, simulator module and plug-in module. If a designer wants to replace the MMI kernel module in a developing project, the present invention allows not only the transplantation and extension of code but also the integration with the existing simulator module. Besides, the plug-in module uses the inter-process communication (IPC) mechanism and the dynamic linking library (DLL) mechanism of the operating system of a host to exchange data with the simulator module and display a mobile phone operation interface so that the simulator module is able to support future plug-in module.

12 Claims, 4 Drawing Sheets

SYSTEM FOR SIMULATING MOBILE PHONE AND METHOD THEREOF

CROSS-REFERENCE TO RELATED APPLICATION

This application claims the priority benefit of Taiwan application serial no. 95126654, filed Jul. 21, 2006. All disclosure of the Taiwan application is incorporated herein by reference.

BACKGROUND OF THE INVENTION

1. Field of the Invention

The present invention relates to a system for simulating mobile phone and method thereof, and more particularly, to a system for simulating mobile phone and method thereof with separately provided man-machine-interface (MMI) kernel module, simulator module and plug-in module.

2. Description of Related Art

At present, system suppliers in the market provides mobile phone simulator systems comprising man-machine-interface (MMI) kernel module and simulator module combined together and integrated with a plug-in module as a developing project. For example, Obigo, TTPComAJAR, Palm, Qualcom, E-SIM/RAPID are so on.

However, the developing language (for example, C++, C, Java and so on) used in designing the conventional system for simulating mobile phone is not quite uniform. Therefore, when a user wants to replace the MMI kernel module in a development project, transplantation and extension of the codes are often difficult. Moreover, the development of different plug-in modules is often restricted by the particular developing language used and hence has difficulties selecting the most suitable programming solution.

SUMMARY OF THE INVENTION

Accordingly, at least one objective of the present invention is to provide a system for simulating mobile phone and method thereof having separately designed man-machine-interface (MMI) kernel module, simulator module and plug-in module. Hence, a user is able to replace the MMI kernel module or plug-in module in a developing project, and eliminate the difficulties of transplanting and extending software (code), and remove the restriction imposed by the developing language and permit the selection of the most suitable programming solution.

To achieve these and other advantages and in accordance with the purpose of the invention, as embodied and broadly described herein, the invention provides a system for simulating mobile phone suitable for a host. The host has a first operating system for providing a first communication protocol and a second communication protocol. The system for simulating mobile phone in the present invention includes a plug-in module, a simulator module and a man-machine-interface (MMI) kernel module. The plug-in module is used for displaying a mobile phone operation interface, and providing a user with executable instructions for operating the mobile phone to generate the instruction data accordingly. The simulator module is used for analyzing the first communication protocol and the second communication protocol provided by the operating system and utilizing the first communication protocol to receive and record the instruction data produced by the plug-in module.

The MMI kernel module uses the second communication protocol to receive and execute the instruction data recorded by the simulator module so that execution data is produced. Then, the execution data is transmitted and recorded to the simulator module through the second communication protocol. When the simulator module receives the execution data, the execution data is transmitted to the plug-in module through the first communication protocol so that the mobile phone operating interface of the plug-in module can display the execution data.

From another perspective, the present invention also provides a method for simulating mobile phone that applies to a host. The host has an operating system for providing a first communication protocol and a second communication protocol. The method of simulating mobile phone according to the present invention includes the following steps. First, a plug-in module, a simulator module and a man-machine-interface (MMI) kernel module are separately provided. The plug-in module is used for displaying a mobile phone operating interface. Then, the mobile phone operating interface receives the operation that the user wants to execute and produces the instruction data accordingly.

Afterwards, the instruction data is transmitted and recorded to the simulator module through the first communication protocol. Next, the instruction data is transmitted to the MMI kernel module through the second communication protocol for producing execution data. Thereafter, the execution data is transmitted and recorded to the simulator module. Finally, the execution data is transmitted to the plug-in module through the first communication protocol so that a mobile phone operating interface can display the execution data.

In one embodiment of the foregoing system for simulating mobile phone and method thereof, the plug-in module is a dynamic linking library (DLL) structured program, the simulator module is a mobile phone simulator program and the MMI kernel module is a MMI kernel program.

In one embodiment of the foregoing system for simulating mobile phone and method thereof, the first communication protocol uses an inter-process communication (IPC) mechanism and a dynamic linking library (DLL) mechanism and the second communication protocol includes the IPC mechanism. The inter-process communication includes a pipe method comprising an anonymous pipe and a named pipe.

In one embodiment of the foregoing system for simulating mobile phone and method thereof, the operating system is a Windows operating system.

The system for simulating mobile phone and method thereof in the present invention provides separately designed MMI kernel module, simulator module and plug-in module instead of integrating the NMI kernel module and the simulator module together. Thus, when the user wants to replace the MMI kernel module in a developing project, the software (code) not only can be rapidly transplanted and extended, but can also be integrated with existing simulator module. Besides, the plug-in module uses the inter-process communication (IPC) mechanism and the dynamic linking library (DLL) mechanism of the operating system of a host to exchange data with the simulator module and display a mobile phone operation interface. Hence, the simulator module is able to support future plug-in module.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
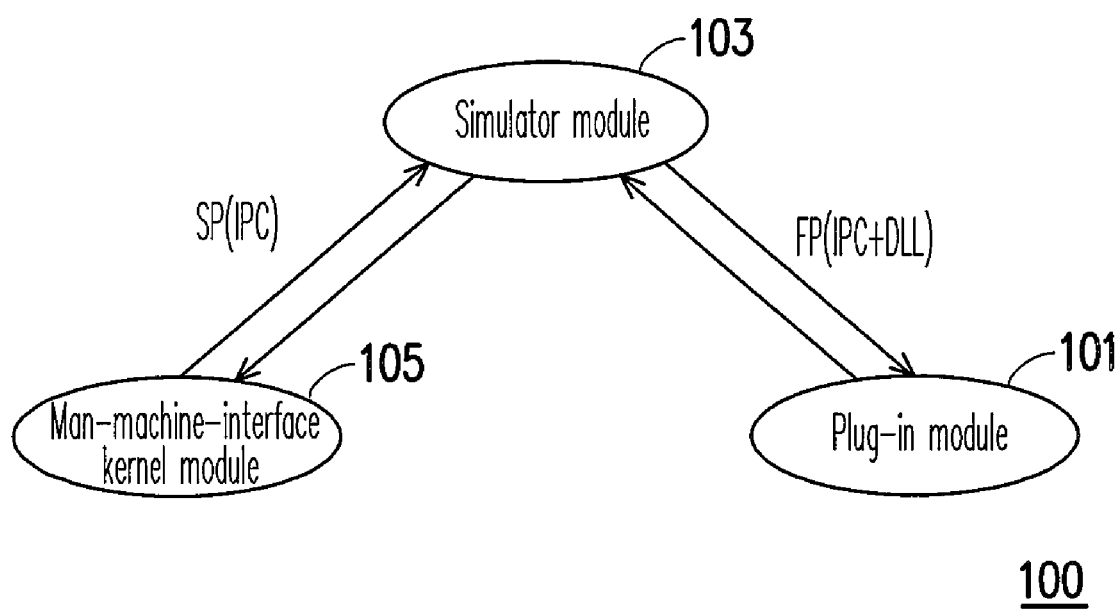
FIG. 1 is a schematic diagram of a system for simulating mobile phone according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a system for simulating mobile phone according to one preferred embodiment of the present invention. As shown in FIG. 1, the system 100 for simulating mobile phone is mainly used for simulating the function of a mobile phone. In other words, the system 100 is mainly used for debugging code. However, the present invention is not limited as such. For example, the system can also be used to detect the state of the mobile phone, the signal of the mobile phone and so on. The system 100 for simulating mobile phone in the present embodiment can be applied to a host. The host has an operating system (OS) and provides a first communication protocol (FP) and a second communication protocol (SP).

In the present embodiment, the first communication protocol uses an inter-process communication (IPC) mechanism and a dynamic linking library (DLL) mechanism and the second communication protocol includes the IPC mechanism. The inter-process communication includes a pipe method comprising an anonymous pipe and a named pipe. It should be noted that the IPC in the present embodiment is not limited to a pipe method. Other methods including, for example, mailslot, memory mapped file, socket, remote procedure calls (RPC), dynamic data exchange (DDE) and so on, can be used.

Figure 2:
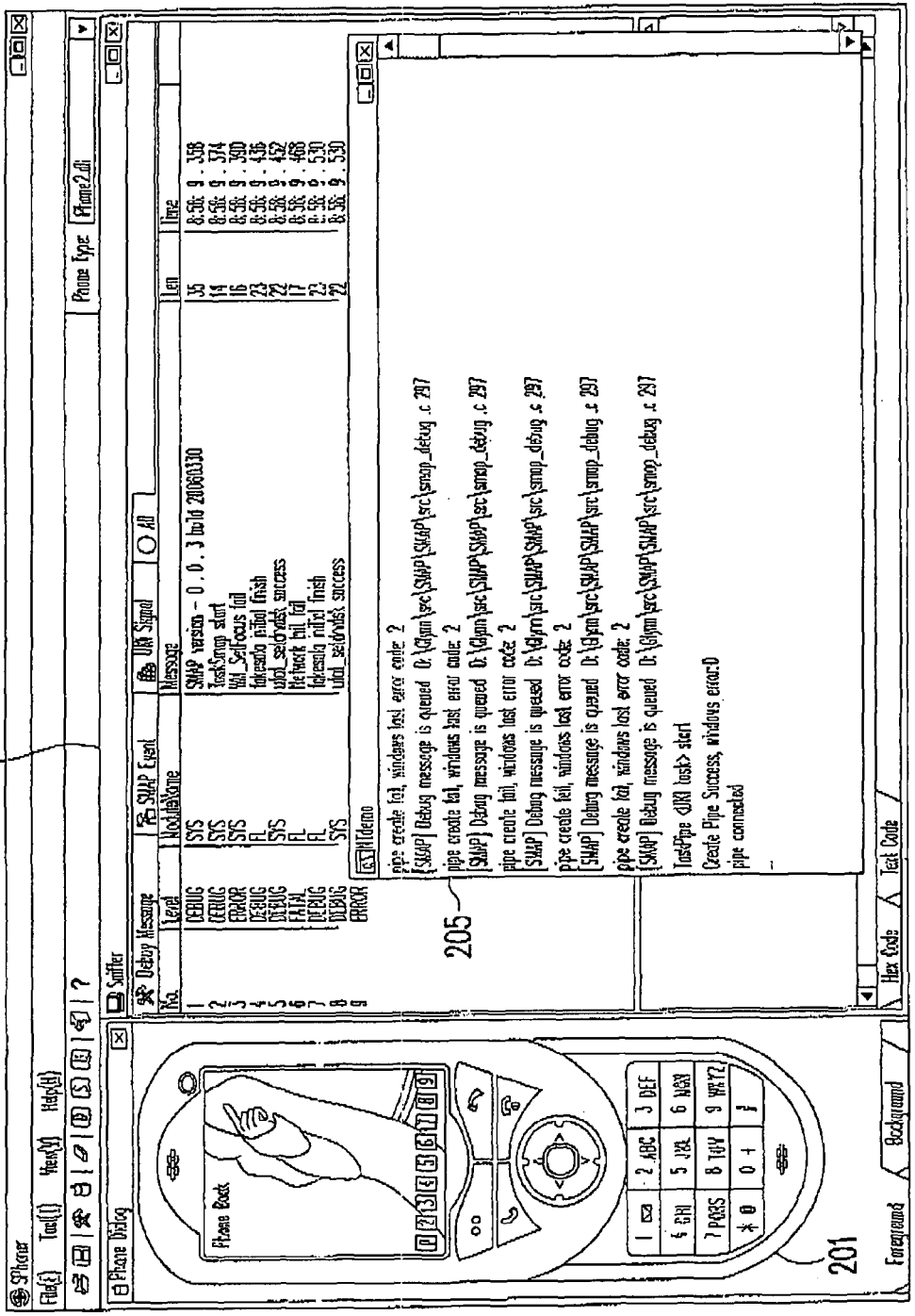
FIG. 2 is a simulated Windows screen of the system for simulating mobile phone according to the present embodiment applied to a host.
Figure 3:
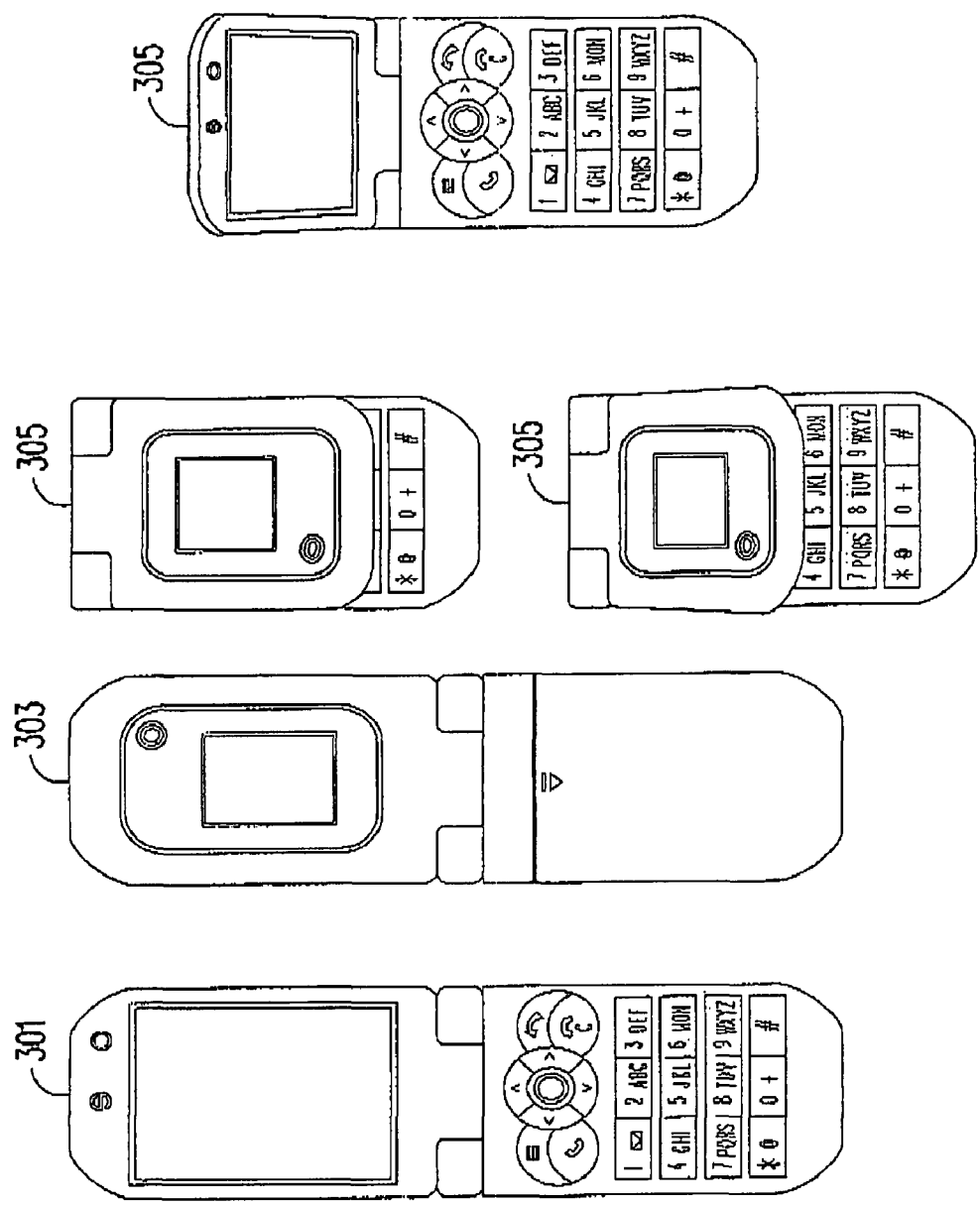
FIG. 3 is a diagram showing the plug-in module of the present embodiment displaying mobile phone operating interfaces.

FIG. 2 is a Windows screen of the system 100 for simulating mobile phone according to the present embodiment applied to a computer host. As shown in FIGS. 1 and 2, the system 100 for simulating mobile phone includes a plug-in module 101, a simulator module 103 and a man-machine-interface (MMI) kernel module 105. The plug-in module 101 is a dynamic linking library structured program (with a secondary file name .dll) for displaying the window of a mobile phone operating interface 201, providing the user with executable operations on the mobile phone operating interface 201 (that is, the user may operate through the mouse or the keyboard of the computer host or the mobile phone operating interface 201) and generating the instruction data accordingly. FIG. 3 is a diagram showing the plug-in module 101 of the present embodiment displaying mobile phone operating interfaces 201. As shown in FIG. 3, the mobile phone display interfaces 201 displayed by the plug-in module 101 may include a foreground 301, a background 303 and a dynamic animation 305 of the mobile phone.

The simulator module 103 is a mobile phone simulator program (an execution file). The execution of the mobile phone simulator program generates a record window 203. After using the record window 203 to analyze the first communication protocol FP and the second communication protocol SP provided by the operating system of the computer host, the first communication protocol FP is used to dynamically download and record the instruction data generated by the plug-in module 101. In the present embodiment, the simulator module 103 is designed with the capacity to dynamically download different plug-in modules 101. In addition, the simulator module 103 also has the capability of resolving the first communication protocol FP and the second communication protocol SP provided by the operating system of the computer host.

The MMI kernel module 105 is a MMI kernel program (an execution file). On executing the MMI kernel program, a Disk Operating System (DOS) 250 window is produced. The MMI kernel module 105 uses the second communication protocol SP provided by the operating system of the computer host to receive and execute the instruction data recorded by the simulator module 103 and generate the execution data. Thereafter, the execution data is transmitted and recorded to the simulator module 103 through the second communication protocol SP. When the simulator module 103 receives the execution data, the execution data is transmitted to the plug-in module 101 through the first communication protocol FP so that the mobile phone operating interface 201 of the plug-in module 101 can display the execution data.

According to the foregoing description of the present embodiment, because the plug-in module 101, the simulator module 103 and the MMI kernel module 105 are separately designed. Thus, when the user wants to replace the MMI kernel module 105 in a developing project or developing a different plug-in module 101, one can transfer or extend code with ease. In order to achieve the function of the system 100 for simulating mobile phone in the foregoing embodiment, a method for simulating mobile phone is illustrated in the following.

Figure 4:
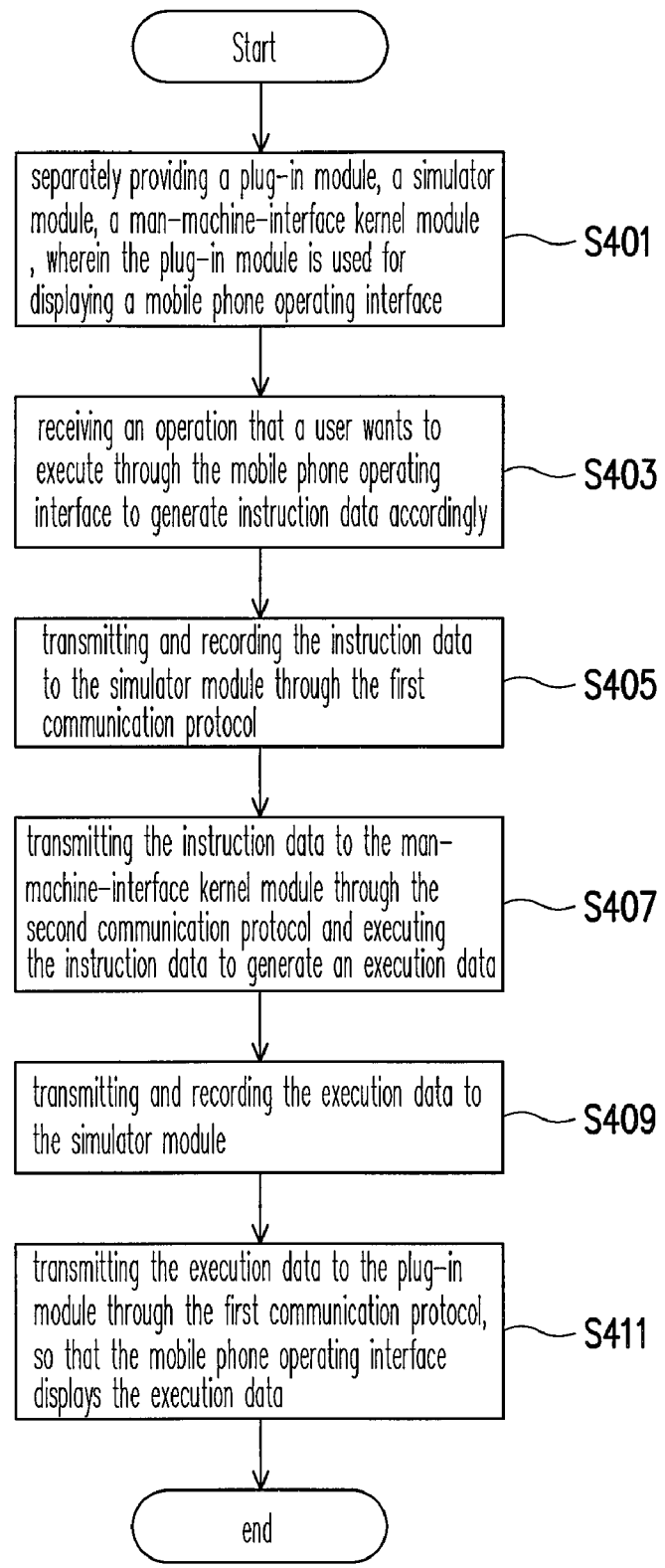
FIG. 4 is a flow diagram showing the method for simulating mobile phone according to one preferred embodiment of the present invention.

FIG. 4 is a flow diagram showing the method for simulating mobile phone according to one preferred embodiment of the present invention. As shown in FIG. 4, the method for simulating mobile phone in the present embodiment is applied to a host (for example, a computer host). The host has an operating system for providing a first communication protocol and a second communication protocol.

In the present embodiment, the first communication protocol uses a inter-process communication (IPC) mechanism and a dynamic linking library (DLL) mechanism and the second communication protocol includes the IPC mechanism. The inter-process communication includes a pipe method comprising an anonymous pipe and a named pipe.

As shown in FIG. 4, the method for simulating mobile phone in the present embodiment includes the following steps. First, in step S401, a plug-in module, a simulator module and a man-machine-interface (MMI) kernel module are separately provided. The plug-in module is a dynamic linking library (DLL) structured program (with a secondary file name .dll) for displaying a mobile phone operating interface. The simulator module is a mobile phone simulator program and the MMI kernel module is a MMI kernel program.

In step S403, the mobile phone operating interface receives the operation executed by the user and generates the instruction data accordingly. For example, the user operates the mobile phone operating interface through the mouse provided by the computer host.

In step S405, the instruction data is transmitted and recorded to the simulator module through the first communication protocol. Then, in step S407, the instruction data is transmitted to the MMI kernel module through the second communication protocol for generating execution data.

After generating the execution data in step S407, the execution data is transmitted and recorded to the simulator module in step S409. Finally, in step S411, through the first communication protocol, the execution data is transmitted to the plug-in module so that the mobile phone operating interface can display the execution data.

In summary, the system for simulating mobile phone and method thereof in the present invention includes the following advantages:

1. When the user wants to replace the MMI kernel module in a developing project, the software (code) is easily transplanted and extended. Moreover, existing simulator module can be integrated.
2. Future plug-in modules are supported.
3. The system for simulating mobile phone and method thereof is unaffected by the developing language.
4. Speed up the process of integrating different MMI kernel modules, plug-in modules and simulator modules by the customers of system manufacturers in the future.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for simulating mobile phone, the system comprising:
    a host, having an operating system which is used for providing a first communication protocol and a second communication protocol, wherein the first communication protocol uses an inter-process communication mechanism and a dynamic linking library mechanism, and the second communication protocol uses the inter-process communication mechanism;
    a plug-in module, being readable and executable by the host, and used for displaying a mobile phone operating interface, so as to permit a user to execute an operation on the mobile phone operating interface to generate an instruction data accordingly;
    a simulator module, being readable and executable by the host, and used for analyzing the first communication protocol and the second communication protocol, and receiving and recording the instruction data from the plug-in module through the first communication protocol, wherein the plug-in module and the simulator module communicate with each other through the first communication protocol; and
    a man-machine-interface kernel module, being readable and executable by the host, and used for receiving and executing the instruction data from the simulator module through the second communication protocol to generate an execution data corresponding to the instruction data, and then transmitting the execution data to the simulator module for recording through the second communication protocol, wherein there is no communication mechanism between the plug-in module and the man-machine-interface kernel module,
    wherein when the simulator module receives the execution data from the man-machine-interface kernel module, the execution data recorded in the simulator module is then transmitted to the plug-in module through the first communication protocol so that the mobile phone operating interface displays the execution data correspondinly;
    wherein the simulator module is further used for debugging the instruction data from the plug-in module and the execution data from the man-machine-interface kernel module; and
    wherein the plug-in module, the simulator module and the man-machine-interface kernel module are developed by different developing languages.

2. The system of claim 1, wherein the plug-in module is a dynamic linking library structured program.

3. The system of claim 1, wherein the simulator module is a mobile phone simulator program.

4. The system of claim 1, wherein the man-machine-interface kernel module is a man-machine-interface kernel program.

5. The system of claim 1, wherein the inter-process communication mechanism comprises a pipe method with an anonymous pipe and a named pipe.

6. The system of claim 1, wherein the operating system is a Windows operating system.

7. A method for simulating mobile phone applicable to a host which having an operating system for providing a first communication protocol and a second communication protocol, the method comprising:
    separately providing a plug-in module, a simulator module and a man-machine-interface kernel module which all are readable and executable by the host, wherein the plug-in module is used for displaying a mobile phone operating interface, the plug-in module and the simulator module communicate with each other through the first communication protocol, the simulator module and the man-machine-interface kernel module communicate with each other through the second communication protocol, the first communication protocol uses an inter-process communication mechanism and a dynamic linking library mechanism, the second communication protocol uses the inter-process communication mechanism, and there is no communication mechanism between the plug-in module and the man-machine-interface kernel module;
    generating an instruction data from the plug-in module by executing an operation on the mobile phone operating interface through a user;
    transmitting the instruction data from the plug-in module to the simulator module through the first communication protocol, and then making the simulator module receive and record the instruction data;
    transmitting the instruction data recorded in the simulator module to the man-machine-interface kernel module through the second communication protocol and then making the man-machine-interface kernel module execute the instruction data to generate an execution data corresponding to the instruction data;
    transmitting the execution data from the man-machine-interface kernel module to the simulator module through the second communication protocol and then making the simulator module record the execution data; and
    transmitting the execution data recorded in the simulator module to the plug-in module through the first communication protocol, and then making the mobile phone operating interface display the execution data correspondingly, wherein the simulator module is further used for debugging the instruction data from the plug-in module and the execution data from the man-machine-interface kernel module; and wherein the plug-in module, the simulator module and the man-machine-interface kernel module are developed by different developing languages.

8. The method of claim 7, wherein the plug-in module is a dynamic linking library structured program.

9. The method of claim 7, wherein the simulator module is a mobile phone simulator program.

10. The method of claim 7, wherein the man-machine interface kernel module is a man-machine-interface kernel program.

11. The method of claim 7, wherein the inter-process communication mechanism comprises a pipe method with an anonymous pipe and a named pipe.

12. The method of claim 7, wherein the operating system is a Windows operating system.

* * * * *